US012803272B2

(12) United States Patent
Zietlow et al.

(10) Patent No.: US 12,803,272 B2
(45) Date of Patent: Nov. 17, 2026

(54) HYBRID DIGITALLY CONTROLLED CIRCUIT BREAKER UTILIZING MEMS RELAY

(71) Applicant: Atomic Machines, Inc., Emeryville, CA (US)

(72) Inventors: Klaus Zietlow, Emeryville, CA (US); Jeffrey Holden, Emeryville, CA (US); Terence Sauer, Emeryville, CA (US)

(73) Assignee: Atomic Machines, Inc., Emeryville, CA (US)

( * ) Notice: Subject to any disclaimer, the term of this patent is extended or adjusted under 35 U.S.C. 154(b) by 280 days.

(21) Appl. No.: 18/671,750

(22) Filed: May 22, 2024

(65) Prior Publication Data

US 2024/0396324 A1 Nov. 28, 2024

Related U.S. Application Data

(60) Provisional application No. 63/503,777, filed on May 23, 2023.

(51) Int. Cl.

| | |
|---|---|
| ***H02H 7/00*** | (2006.01) |
| ***H02H 1/00*** | (2006.01) |
| ***H02H 7/22*** | (2006.01) |
| ***H02J 3/14*** | (2006.01) |

(52) U.S. Cl.
CPC ............ *H02H 7/22* (2013.01); *H02H 1/0007* (2013.01); *H02J 3/14* (2013.01)

(58) Field of Classification Search
CPC ........................................................ H02H 7/22
See application file for complete search history.

(56) References Cited

U.S. PATENT DOCUMENTS

| | | | | |
|---|---|---|---|---|
| 11,049,671 | B2 * | 6/2021 | Compton | H02J 3/007 |
| 2013/0003262 | A1 | 1/2013 | Kumfer et al. | |
| 2013/0038975 | A1 * | 2/2013 | Hafner | H01H 33/596 361/93.9 |
| 2013/0229068 | A1 | 9/2013 | Sanders, III et al. | |
| 2019/0123549 | A1 | 4/2019 | Rodrigues et al. | |
| 2020/0108412 | A1 | 4/2020 | Greenberg et al. | |
| 2022/0189721 | A1 | 6/2022 | Telefus et al. | |
| 2024/0351860 | A1 * | 10/2024 | Boettcher | B81B 3/0091 |
| 2024/0396324 | A1 * | 11/2024 | Zietlow | H02H 1/0007 |

* cited by examiner

*Primary Examiner* — Stephen W Jackson
(74) *Attorney, Agent, or Firm* — Polsinelli PC; Kory D. Christensen; David Hsu

(57) ABSTRACT

A hybrid circuit breaker that combines low on-resistance with very fast actuation time and extremely small size, the breaker including a first relay circuit coupled between an external voltage source and an external load via a line in input terminal coupled to the voltage source and a line out output terminal coupled to the load, the first relay circuit formed of a MEMS device, a second relay circuit coupled in parallel to the first relay circuit, and a control logic circuit having a first pair of control terminals coupled to the first and second relay circuits, and at least one current sense input coupled in series with the first relay circuit, the breaker further including one or more circuits connected in parallel with the first relay to mitigate damage from arcing events, and a second relay in series with the first relay to provide galvanic isolation, the one or more circuits coupled in parallel may be either solid state or mechanical (MEMS) relays.

26 Claims, 8 Drawing Sheets

HYBRID DIGITALLY CONTROLLED CIRCUIT BREAKER UTILIZING MEMS RELAY

CROSS-REFERENCE TO RELATED APPLICATION

The present application claims the benefit of priority to U.S. Provisional Patent Application No. 63/503,777 filed May 23, 2023, and entitled "HYBRID DIGITALLY CONTROLLED CIRCUIT BREAKER UTILIZING MEMS RELAY," the disclosure of which is hereby incorporated by reference for all purposes.

BACKGROUND

Technical Field

The present disclosure pertains to devices for managing electrical power and, more particularly, to a remotely switchable circuit breaker that is constructed with a microelectromechanical (MEMS) relay.

Description of the Related Art

There is a need for a remotely switchable circuit breaker for load shedding and "smart grid" power management applications. This has not been possible to date, because the switching components available are too large, too power inefficient and too expensive for an economically viable switchable breaker.

Various suppliers are manufacturing and selling 'smart circuit breakers' which can be installed in existing or new load centers in residences and commercial buildings. The goal of smart breakers is to provide existing circuit protection capability while adding the capability to be remotely controlled. These existing devices use semiconductor switches and/or conventional electro-mechanical relays to control the current path.

For both technical and economic reasons, overcurrent protection is usually still provided by conventional breaker technology (thermal or magnetic trip). In the case of breakers made with semiconductors in the primary current path, the forward voltage required by semiconductor switches combined with their high on-resistance leads to untenable heat dissipation levels for all but the lowest current rating breakers (10-15A), and even those require nontrivial thermal design work (including heat sinking, which requires significant space). Exacerbating the situation, an air gap solution is still required in semiconductor breakers, per the UL489 standard, and that is typically provided with an additional conventional electromechanical relay, adding cost and physical size.

Smart breakers made utilizing electromechanical relays are very bulky because the components are too large to fit into a standard breaker housing along with all other required components. The size of breakers is important, because the form factor of load centers is established and there is limited total space for breakers. An oversized breaker consumes two or three pole locations, reducing the total number of circuit breakers that can be installed in the load center.

Beyond the size, the cost of the existing smart breaker products is prohibitive, driven by the cost of the additional switching componentry. Between the cost, size and thermal issues, the market for smart breakers remains largely unsatisfied.

BRIEF SUMMARY

The present disclosure is directed to a hybrid breaker that utilizes a microelectromechanical (MEMS) relay. In accordance with one aspect of the present disclosure, a hybrid breaker for use with a voltage source and a load is provided. The breaker includes a first relay circuit having first and second control input terminals, the first relay circuit coupled in series with the voltage source and load via a line in input terminal coupled to the voltage source, and a line out output terminal coupled to the load, the first relay circuit including a MEMS device; a second relay circuit having first and second control input terminals, the second relay circuit coupled in parallel to the first relay circuit with a line in input terminal coupled to the voltage source, and a line out output terminal coupled to the load; and a control logic circuit having a first pair of control terminals coupled to the first and second control input terminals of the first relay circuit, a second pair of control terminals coupled to the second relay circuit, and at least one current sense input coupled to the voltage source.

This unique device combines low on-resistance (less than 10 milliohms, and preferably less than 1 milliohm, and more preferably less than 100 micro-Ohms) with extremely small size (dimensions less than 1.5 cm diameter by 1 cm thick and preferably less than 10 mm diameter by 4 mm thick). Using this relay as a component within a smart circuit breaker meets several needs:

1) The low on-resistance means the relay can conduct loads of at least 15 amps continuously, and preferably at least 100 amps continuously, and more preferably at least 200 amps continuously without requiring a massive heat sink. As a result, the MEMS relay can be the primary switching element in the current path without creating significant thermal issues, which is a major problem with semiconductor-based smart breakers. The low on-resistance of the relay of the present disclosure can potentially improve the energy efficiency of standard breakers.
2) The electro-mechanical nature of the relay provides a physical air gap between the line and the load. This prevents leakage current from flowing when the breaker is tripped, which is not achievable using semiconductor switches.
3) The small physical size of the relay and exceptionally low heat generation even at very high currents allows the entire package to be smaller than any existing electro-mechanical relay with similar current characteristics. In particular, it allows a smart breaker to be packaged in the standard 0.75"-wide circuit breaker package, or within the 17.5 to 18.0 mm width specified by the DIN 43880 standard in Europe.

The MEMS relay of the present disclosure (which is electronically controllable) becomes the primary current-carrying component in the circuit breaker. Because of its small mass, the MEMS relay must be protected from two cases: (1) arcing during opening and/or closing; and (2) extremely high current cases, caused by short circuits or similar phenomena. Circuit breakers are rated to different levels of "High Interrupting Current" (HIC), and the relay of the present disclosure enables at least the 10 kA and 22 kA cases to be addressed.

To prevent arcing during scheduled opening or closing, zero current or zero voltage switching is used respectively. Current and voltage sensors are used to determine the most favorable time for the switch transition to minimize arcing potential.

In the HIC case, the current rises too fast to allow waiting for a zero crossing before opening, so a different solution is utilized. In this HIC case, a solid-state relay (MOSFETS or similar) is wired in parallel with the MEMS relay, and when the logic monitoring the rate of change of current with respect to time of the system detects an HIC condition, the solid-state relay is closed to provide a bypass current path. The MEMS relay is then opened, and once it reaches a safe opening gap for the required voltage standoff the solid-state relay is opened. The current rises at a rate that is determined by the overall circuit impedance and is on the order of 2 A-15 A/μs. Therefore, early detection of a true short circuit (rather than inrush or other normal current fluctuations) and a rapid response to open the circuit is paramount to reducing the overall load seen by the switch during opening. The high speed of the MEMS relay makes this type of design possible at an economic price point, because the solid-state relay must only conduct for the brief time period during which the MEMS relay is moving from its closed position to a minimum contact gap. A solid-state relay consisting of MOSFETs, IGBTs (Insulated Gate Bipolar Transistors) or similar semiconductor devices is utilized to provide a temporary low-impedance channel for current while the MEMS relay switches state.

One significant concern for this hybrid approach is the cost of the semiconductors required, particularly the power MOSFETs, which need to conduct the current during the time the MEMS relay is partially open. These MOSFETs need to dissipate electrical energy in the form of heat. The energy to dissipate is the integral over time of the product of the current and the voltage. The voltage across the MOSFETs is, in turn, the product of the current and the internal resistance of the MOSFETs. This energy is expressed as the number of Joules a MOSFET can tolerate in a single event. The total energy may be reduced by one or both of a) shortening the time during which the MOSFETs must conduct the current and b) reducing the rate of current increase.

a) Shortening active MOSFET time: The key opportunities here lie in improvements brought about by the MEMS relay. The opening time is measured from the point at which the Control Logic determines the relay must open until the time the MEMS relay has opened far enough to provide adequate withstand distance to prevent an arc from forming. The design of our MEMS relay provides the ability to tune the motion parameters to maximize actuator velocity, which allows an opening time of 50 microseconds or less. Desired short opening times are driven by the size and expense of components required to manage the energy which accumulates during a short circuit event. This is important as the energy is proportional to the third power of the time to open. An opening time less than 1 millisecond is a significant advantage over most conventional mechanical or solid state relays, and a opening time of less than 100 microseconds is preferable. An opening time of less than 50 microseconds is more preferable.
b) Adding an inductor in series with the line input limits the slew rate of the current. It does not reduce the final current level, which will eventually result if the breaker does not open, but it slows down the rise of the current. This results in a lower current by the time the relay has reached its fully open state.

These two approaches used separately or in combination permit the use of less capable and therefore less costly semiconductor components in the Solid-State Relay used to carry the current during the MEMS relay opening time.

An alternative approach to the solid-state bypass during the HIC case is the use of a secondary relay. This relay is connected in parallel with the primary relay and is used to take the brunt of the energy during a HIC opening. This design takes advantage of the UL regulatory requirements for circuit breakers that stipulate that a breaker only has to survive two such HIC events. The secondary relay could be built with higher on-resistance and more arc resistant contacts including an arc chute. Its resistance is not critical as it only conducts during the opening time of the primary relay. During a HIC event the primary relay would open ahead of this secondary relay directing all of the arc energy to the latter. Unlike solid-state relays, a mechanical relay does not have PN junctions that impose a minimum voltage for conduction to occur. This allows for a smooth redirection of the current from the primary relay to the secondary relay, since they are already actively sharing current at that time. This reduces inductive kick back and its associated jump in voltage across the primary MEMS relay, which is advantageous to prevent arcing.

During scheduled openings the two relays can be switched using the same timing, which results in zero current crossing opening and zero voltage crossing closing of the relays.

If the MEMS relay is designed to never fail closed during a HIC event, then a third approach could be used where three such relays are wired in parallel. Only one of them will be used at a time. If a HIC event is detected and dealt with by that relay, it is declared (electronically) out of commission and the next one is selected for future HIC events. This meets the UL requirement of surviving two HIC events while also having the advantage of giving the user feedback as to when a replacement might be needed.

Another advantage of the electromechanical bypass over a solid-state approach is that it provides an air gap with a single series element. This reduces overall power consumption of the breaker as the current only flows through a single contact.

In an embodiment, a circuit for use in circuit breakers with a voltage source and a load, includes a first relay circuit having first and second control input terminals. The first relay circuit is coupled in series with the voltage source and the load using one or more line in input terminals coupled to the voltage source and one or more line out output terminals coupled to the load. The first relay circuit includes a MEMS device. The circuit includes a second relay circuit having first and second control input terminals. The second relay circuit is coupled in parallel with the first relay circuit using the one or more line in input terminals coupled to the voltage source and the one or more line out output terminals coupled to the load. The circuit includes a control logic circuit having a first pair of control terminals coupled to the first and second control input terminals of the first relay circuit, a second pair of control terminals coupled to the second relay circuit, and at least one current sense input coupled to the voltage source.

In an embodiment, the control logic circuit includes a third pair of control terminals and the circuit includes a third relay circuit having first and second control input terminals coupled to the third pair of control terminals and one or more line in input terminals coupled to the voltage source and one or more line out output terminals coupled to the load such that the third relay circuit is coupled in parallel with the first and second relay circuits.

In an embodiment, the second and third relay circuits each have a relay design that is different from the MEMS device of the first relay circuit. In an embodiment, the third relay circuit is a sacrificial device. In an embodiment, the second and third relay circuits each include a MEMS relay that is identical to the MEMS device of the first relay circuit.

In an embodiment, the control logic circuit is configured to determine whether the second relay circuit has been damaged by an earlier short circuit. In an embodiment, in response to determining that the second relay circuit has not been damaged, the control logic circuit is configured to control the first and second relay circuits to operate in a closed state during normal operation, detect an increase in current, in response to detecting the increase in current, control the first relay circuit to transition to an open state, delay for a fixed time duration, and after delaying for the fixed time duration, control the second relay circuit to transition to the open state; and In an embodiment, the control logic circuit is configured to in response to determining that the second relay circuit has been damaged, control the first and third relay circuits to operate in the closed state during normal operation, detect an increase in current, in response to detecting the increase in current, control the first relay circuit to transition to the open state, delay a fixed amount of time duration, and after delaying for the fixed time duration, control the third relay circuit to transition to the open state.

In an embodiment, the second relay circuit includes a solid-state relay circuit. In an embodiment, the second relay circuit is a sacrificial device.

In an embodiment, the control logic circuit is configured to control the first and second relay circuits to operate in a closed state during normal operation, detect an increase in current, in response to detecting the increase in current, preemptively control the first relay circuit to transition to an open state, determine that the increase in current is a true short, and in response to determining that the increase in current is a true short, control the second relay circuit to transition to the open state. In an embodiment, the control logic circuit is configured to determine that the increase in current is a true short by determining that the true short is not an inrush current event.

In an embodiment, the control logic circuit is configured to control the first and second relay circuits to operate in a closed state during normal operation, detect an increase in current, in response to detecting the increase in current, preemptively control the first relay circuit to transition to an open state, determine that the increase in current is an inrush current event, and in response to determining that the increase in current is an inrush current event, control the first relay circuit to transition to the closed state.

In an embodiment, the control logic circuit is configured to control the first and second relay circuits to operate in a closed state during normal operation, detect an increase in current, in response to detecting the increase in current, control the first relay circuit to transition to an open state, delay for a fixed time duration, and after delaying for the fixed time duration, control the second relay circuit to transition to the open state.

In an embodiment, a method includes operating first and second relay circuits in a closed state. The first and second relay circuits are coupled to each other in parallel and the first and second relay circuits are together coupled in series to a voltage source and a load. The first relay circuit includes a MEMS device. The method includes sensing a current from the voltage source, detecting an increase in the current, in response to detecting the increase in current, preemptively controlling the first relay circuit to transition to an open state, determining whether the increase in current is a true short or an inrush current event, and selectively controlling the first relay circuit to transition to the closed state or the second relay circuit to transition to the open state depending on whether the increase in current is an inrush current event or a true short.

In an embodiment, selectively controlling the first relay circuit to transition to the closed state or the second relay circuit to transition to the open state includes in response to determining that the increase in current is an inrush current event, controlling the first relay circuit to transition to the closed state.

In an embodiment, selectively controlling the first relay circuit to transition to the closed state or the second relay circuit to transition to the open state includes in response to determining that the increase in current is a true short, controlling the second relay circuit to transition to the open state.

In an embodiment, the second relay circuit includes a MEMS relay that is identical to the MEMS device of the first relay circuit.

In an embodiment, a system includes a voltage source, a load, and a circuit including a first relay circuit having first and second control input terminals. The first relay circuit is coupled in series with the voltage source and the load using one or more line in input terminals coupled to the voltage source and one or more line out output terminals coupled to the load. The first relay circuit includes a MEMS device. The circuit includes a second relay circuit having first and second control input terminals. The second relay circuit is coupled in parallel with the first relay circuit using the one or more line in input terminals coupled to the voltage source and the one or more line out output terminals coupled to the load. The circuit includes a control logic circuit having a first pair of control terminals coupled to the first and second control input terminals of the first relay circuit, a second pair of control terminals coupled to the second relay circuit, and at least one current sense input coupled to the voltage source.

In an embodiment, the control logic circuit includes a third pair of control terminals and the circuit includes a third relay circuit having first and second control input terminals coupled to the third pair of control terminals. In an embodiment, the third relay circuit is coupled in parallel with the first and second relay circuits, and together the first, second and third relay circuits are coupled in series between the voltage source and the load.

In an embodiment, the second and third relay circuits each include a MEMS relay that is identical to the MEMS device of the first relay circuit. In an embodiment, the second and third relay circuits each have a relay design that is different from the MEMS device of the first relay circuit. In an embodiment, the second and third relay circuits are sacrificial devices. In an embodiment, the second and third relay circuits each include a solid-state relay circuit.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
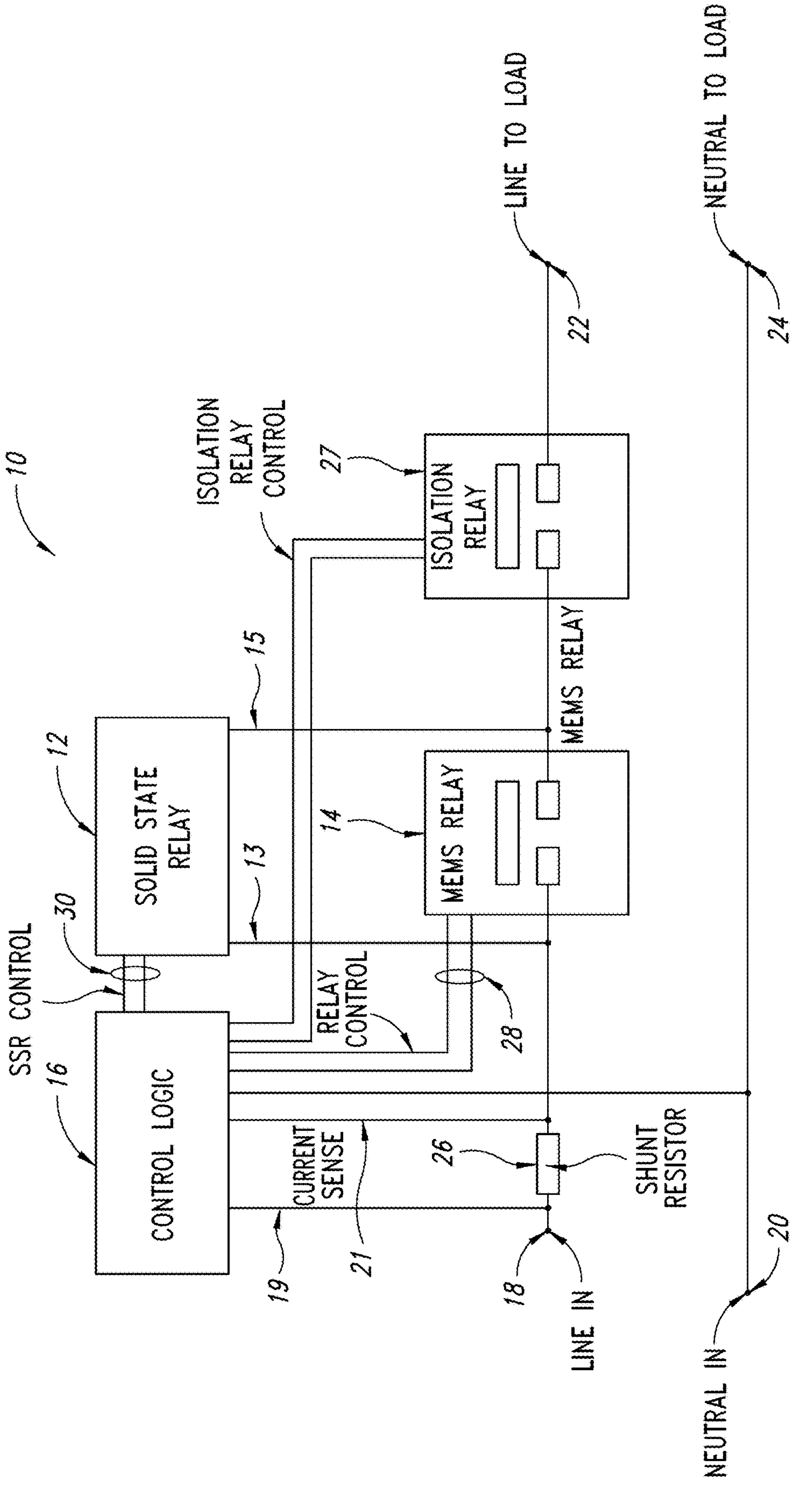
FIG. 1 is an illustration of a hybrid circuit breaker formed in accordance with the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with breakers, relays, coils, and typical electrical components have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" means that a particular feature, structure, or characteristic described in connection with the implementation is included in at least one implementation. Thus, the appearance of the phrases "in one implementation" or "in an implementation" in various places throughout this specification are not necessarily all referring to the same implementation. Furthermore, the particular features, structures, or characteristics may be combined in any suitable manner in one or more implementations. It will be appreciated that for simplicity and clarity of illustration, where considered appropriate, reference numerals may be repeated among the figures to indicate corresponding or analogous elements or steps.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

The present disclosure is directed to a 'hybrid' breaker, utilizing both semiconductor and electro-mechanical components. This unique device is enabled by the availability of a MEMS relay that combines low on-resistance (in one instantiation <100 micro-Ohms) with extremely small size (in one instantiation dimensions approximately 10 mm diameter by 4 mm thick.) The semiconductor parts are used to determine when to open or close the MEMS relay. Semiconductors may also be used to protect the MEMS relay from arcing when opening under load. The decision to switch from open to closed or vice versa may be based on measuring an over-current condition caused by a circuit fault, or may be based on a signal coming from an external source. Such a signal could be transmitted over a wired or wireless connection.

The MEMS relay components in this design provide unique value because the miniature size of the MEMS relay allows the inclusion of multiple relays within a standard circuit breaker package. Standard relays are far too large to support this type of design. Keeping the overall circuit breaker to a standard size allows the breaker to be installed as a retrofit into existing circuit panels, greatly increasing the potential market for such a device.

In addition, the opening speed of the MEMS relay is dramatically faster than that of a standard mechanical relay. The small moving mass of the moving part allows it to accelerate extremely quickly. The opening time of the MEMS relay is less than 50 microseconds, whereas standard mechanical relay opening times are typically measured in milliseconds. The opening time of most solid-state relays (SSRs) can be as much as 8 milliseconds because most SSRs are only able to open at a zero crossing, which happens twice in a 1/60 second cycle. The rapid speed of the MEMS relay means that the current has significantly less time to climb before the relay is open. The energy which the relay must dissipate during this high current load is proportional to the current squared times the contact resistance. Thus, limiting the maximum current will reduce total energy in a more than linear fashion.

Electro-mechanical relays can experience arcing during opening or closing, when the gap between the contacts is smaller than the withstand distance required for the voltage being switched. The voltage experienced by the contacts may be significantly higher than the line voltage due to inductance in the load.

The present disclosure includes three possibilities for reducing the likelihood of arcing:

1) Because the relay is triggered using electronics, the signal to open the MEMS relay may be timed to allow the relay to open at the point in the AC current cycle when there is no current flowing through the relay.
2) Approach 1 may not always be possible, particularly when there is a short circuit and the current is rising rapidly. In this situation, a solid-state relay (SSR) may be closed in parallel with the electromechanical MEMS relay in order to limit the voltage across the MEMS relay during the critical time when its contacts are only partially open. The SSR will heat rapidly under current loads, so it must itself be opened within a short time (~100 microseconds) once the MEMS relay is open. In this approach the SSR acts as the 'Arc Suppressing' or 'Interrupting Contact' because it is the device that stops or interrupts current flow.
3) The third approach is similar to Approach 2, but instead of an SSR in parallel with the MEMS relay, it uses one or more additional MEMS relays as interrupting contacts. These additional MEMS relays may not have such low on-resistance as the primary relay, but may have a better tolerance for arcing, which may damage or destroy the primary MEMS relay. This improved arcing tolerance may be the result of design changes in the secondary MEMS relay, primarily in the form of contact material or geometry, and/or by the addition of an arc chute to dissipate the energy of any existing arc.

UL testing requires that circuit protection devices survive at least two High Available Fault Current Short Interruption events ("High Interruption Current" or "HIC" events) in which they are shorted while supplied with a high-current line source. In one implementation of Approach 3 above, the circuit breaker may include multiple sacrificial MEMS relays used as interrupting contacts to protect the primary MEMS relays from damage.

In each of the two required events one of the sacrificial MEMS relays may be destroyed. The next MEMS relay would then be brought into service to provide protection from the next event. The circuit breaker is thus prepared to survive n−1 events and to provide protection for n events, where n is the number of MEMS relays included in the package.

FIG. 1: SSR Relay

FIG. 1 illustrates the implementation of a hybrid breaker 10 in accordance with the present disclosure. The hybrid breaker 10 includes a Solid-State Relay (SSR) 12, which is used as the interrupting contact, coupled in parallel to a MEMS relay 14 by first and second line 13, 15. The Solid-State Relay 12 and the MEMS relay 14 are both coupled to and controlled by a Control Logic 16. AC Power is supplied from a source (not shown) to the hybrid breaker 10 at a Line In Input terminal 18 and a Neutral In terminal 20, seen at the left side of FIG. 1. The hybrid breaker 10 is also coupled to a load (not shown) via a Line to Load terminal 22 and Neutral to Load terminal 24, which are seen at the right side of FIG. 1. Note that in FIG. 1 the MEMS relay 14 is shown in an open position. FIG. 1 includes an isolation relay 27 that provides an air gap between input and output. This is required by some electrical codes to provide galvanic isolation for increased safety and to eliminate leakage currents through an open SSR. The isolation relay 27 is coupled to and controlled by the Control Logic 16.

In normal operation, the MEMS relay 14 and Isolation Relay (27) are closed, providing a low-impedance path for current to flow through the hybrid breaker 10 to the Line to Load terminal 22 and Neutral to Load terminal 24 terminal, which are seen at the right side of FIG. 1.

Current through the hybrid breaker 10 is measured by means of a shunt resistor 26 connected in series with the load. (Note that other means of current measurement may be equally suitable, such as a current transformer or a Rogowski coil.) The Control Logic 16 measures the voltage across the shunt resistor 26 via lines 19 and 21, and with a known value of the shunt resistor 26, it can calculate the current. When the Control Logic 16 determines that it is necessary to open the breaker 10, it proceeds in one of two ways:

a) If this is a commanded opening in non-HIC conditions, the Control Logic 16 determines a safe opening time to minimize arcing energy (zero voltage or zero current) and sends a pulse on relay control lines 28 coupled to the MEMS relay 14 to open the MEMS relay 14, as shown in FIG. 1.

b) If this is an HIC event, the MEMS relay 14 must be protected from arcing. In this case, the Control Logic 16 first sends a signal to the SSR 12 via SSR control lines 30 to turn it on, limiting the voltage seen by the MEMS relay 14 as it opens. The Control Logic 16 then sends the current pulse to the MEMS relay 14, causing it to open. Once the MEMS relay 14 has opened, the SSR 12 is then turned off by the Control Logic 16, interrupting the current without arcing. Note that the SSR 12 can always be on when the MEMS relay 14 is on because it would not carry any current being shunted by the much lower resistance of the MEMS relay 14.

Figure 2:
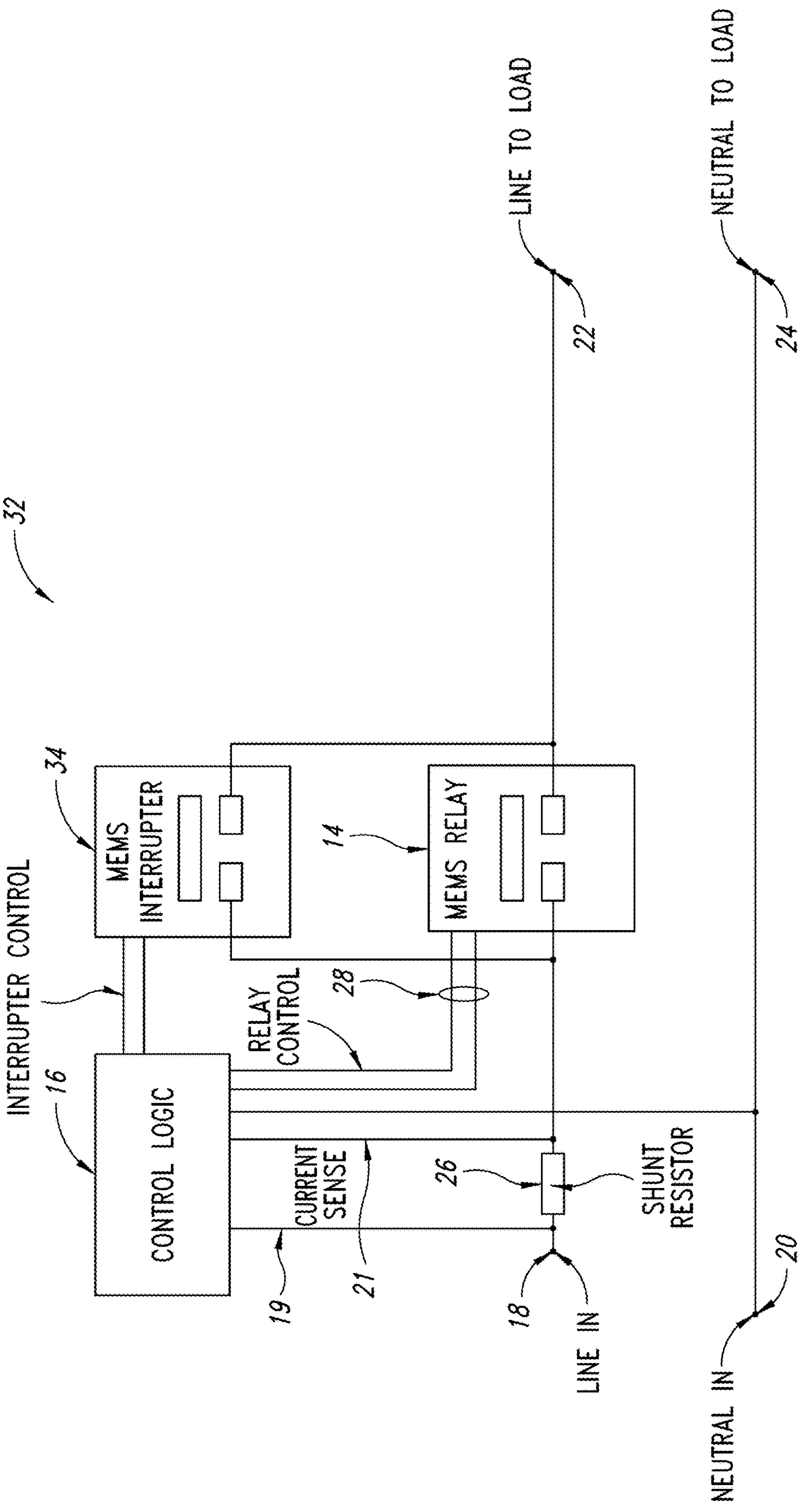
FIG. 2 is an illustration of a second implementation of a hybrid circuit breaker using two separate MEMS relays in accordance with the present disclosure.

FIG. 2: MEMS Secondary

FIG. 2 illustrates a second implementation of a hybrid breaker 32, including two separate MEMS relays 14 and 34. For ease of reference, common elements among the drawings will be referred to using the same reference number throughout. A primary MEMS relay 14, labeled "MEMS Relay," is the previously described MEMS relay 14 with an extremely low on-resistance. A secondary MEMS relay 34 is provided in place of the SSR 12 from FIG. 1 and is labeled "MEMS Interrupter." The secondary relay or MEMS Interrupter 34 is a device with a different contact design. The contact design in the primary MEMS relay is optimized for low contact resistance and may be formed using conductive liquid or micromachined arrays of flexures. The contact design in the interrupter or interrupters is optimized for resilience to arcing events. Because low contact resistance is less critical, the interrupter may use a standard contact design that allows for larger mass and more robust materials. As shown in FIG. 2, the MEMS Interrupter 34 is shown in an open condition. In this case, the low on-resistance is less critical, and the main design goal is robustness against arcing. The contact material will be chosen from a library of standard contacts, typically including silver alloys. The secondary relay still needs a fast opening time to reduce the current at opening. Ideally it will be just slightly delayed from the primary relay to minimize the overall time to clearing the fault.

In this design, when the Control Logic 16 identifies an HIC event, it will first open the MEMS relay 14, leaving the MEMS Interrupter 34 closed. The voltage across the entire device will rise as the impedance of the MEMS Interrupter 34 is greater than that of the MEMS relay 14. After a defined delay to allow the MEMS relay 14 to open past the breakdown distance, the Control Logic 16 will send a pulse to the MEMS Interrupter 34 to cause it to open. The MEMS Interrupter 34 may be configured with an arc chute 36 (shown in FIG. 4) to reduce the impact of arcs that are caused by this opening of the hybrid breaker 32. (See FIG. 4 for an illustration including the arc chute 36.)

Figure 3:
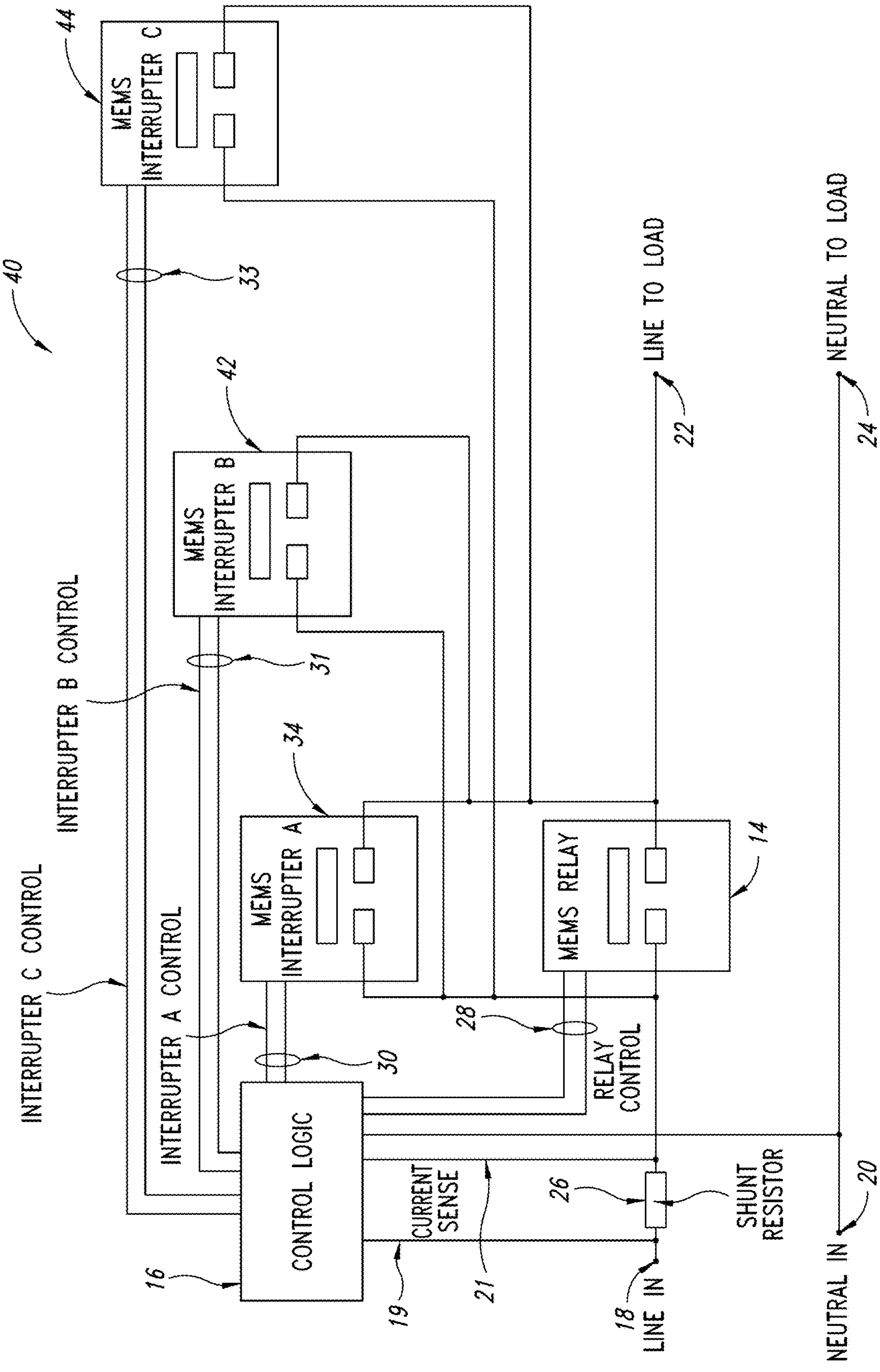
FIG. 3 is an illustration of an alternative design to support the situation where the MEMS Interrupter in FIG. 2 proves unable to tolerate even the two HIC events which are required to pass UL certification.

FIG. 3: MEMS Sacrificial

FIG. 3 illustrates an alternative design of a hybrid breaker 40 to support the situation where the MEMS Interrupter 34 in FIG. 2 proves unable to tolerate even the two HIC events that are required to pass UL certification. In this case, the complete hybrid breaker 40 will contain a number of MEMS Interrupters 34, 42, 44, each connected to the Control Logic 16 via control lines 30, 31, 33, respectively. These MEMS Interrupters 34, 42, 44 may be the same design as the MEMS relay 14 itself, or they may have a different type of contact if that is preferable. These interrupters are not expected to survive one or more HIC events. They may be damaged in the process of opening, and are therefore called "sacrificial interrupters."

In FIG. 3 the number of sacrificial MEMS Interrupters 34, 42, 44 is three, but the number could be any number greater than or equal to two. The three MEMS Interrupters 34, 42, 44 in FIG. 3 are labeled MEMS Interrupter A 34, MEMS Interrupter B 42, and MEMS Interrupter C 44.

The operation of the hybrid breaker 40 in FIG. 3 is similar to that in FIG. 2, with the exception that the Control Logic 16 will cycle through the MEMS Interrupters 34, 42, 44. When the hybrid breaker 40 is new, in standard operation the MEMS Interrupter A 34 will be closed, and MEMS Interrupter B 42 and MEMS Interrupter C 44 will be open. In the event of a first HIC event, the Control Logic 16 will immediately open the MEMS relay 14, followed by the opening of the MEMS Interrupter A 34.

When the fault has been corrected and the hybrid breaker 40 is reset, the Control Logic 16 will assume that MEMS Interrupter A 34 has been damaged. It will leave MEMS Interrupter A 34 open and will replace its function with MEMS Interrupter B 42 until a second HIC. After the second HIC, the Control Logic 16 will assume MEMS Interrupter B 42 is damaged and will leave it open, replacing its function with MEMS Interrupter C 44. This pattern will continue for as many interrupters as exist in the breaker. Note that it is possible to measure the contact resistance of the MEMS Interrupters 34, 42, 44, so the Control Logic 16 may be able to use each MEMS Interrupter 34, 42, 44 for more than one HIC until the respective MEMS Interrupter 34, 42, 44 no longer has low enough contact resistance. Circuitry for measuring the Interrupter contact resistance is not shown in FIG. 3.

Figure 4:
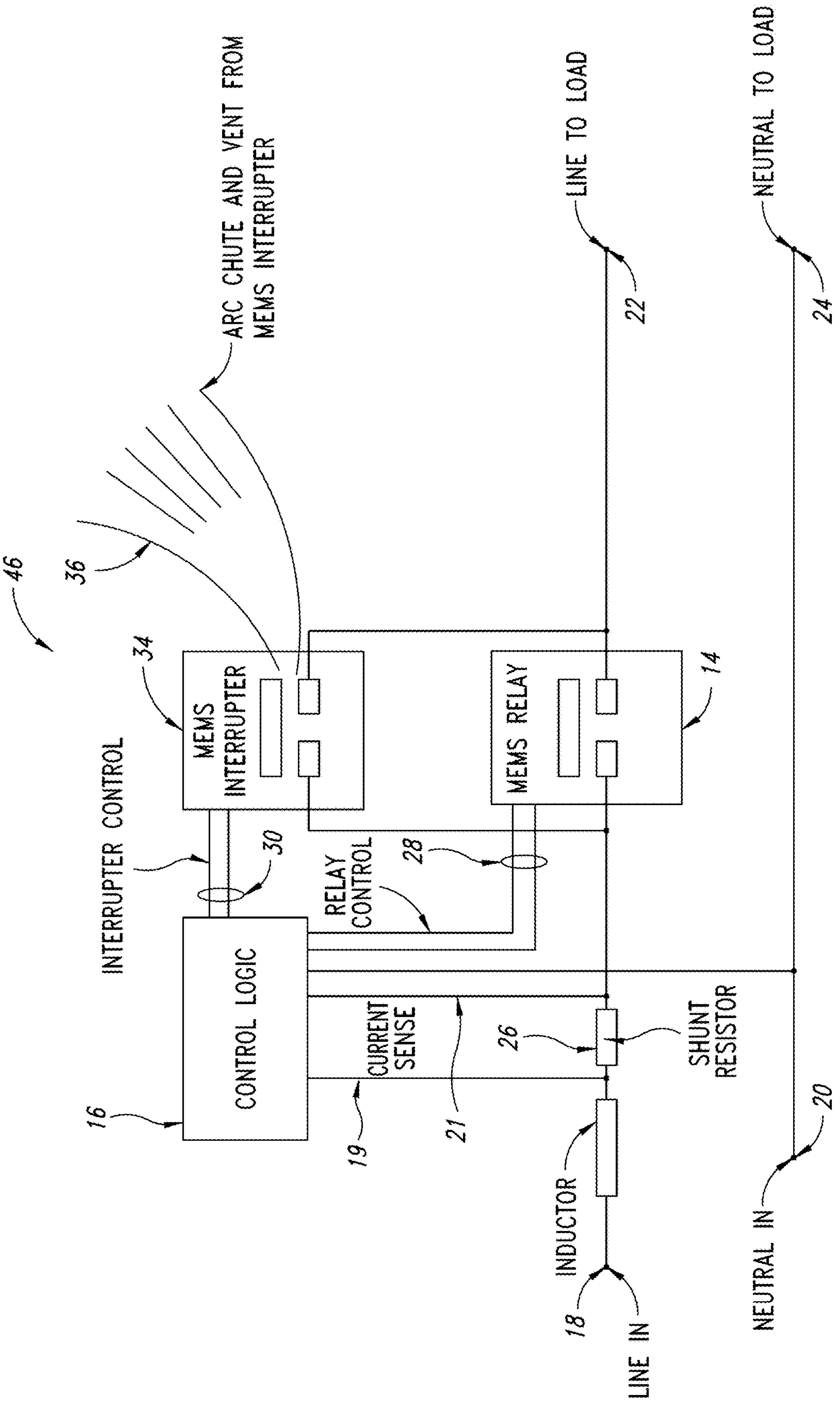
FIG. 4 illustrates the placement of an input inductor to limit the rate of current rise, and of an arc chute to provide better dissipation of any arc created at the secondary relay.

FIG. 4: MEMS Secondary with Arc Chute and Input Inductor

FIG. 4 illustrates yet another implementation of the present disclosure in which a hybrid breaker 46 is provided. In this hybrid breaker 46, an input inductor 48 is coupled or directly connected between the Line In input terminal 18 and the shunt resistor 26 and is configured to limit the rate of current rise, and an arc chute 36 is incorporated into the MEMS interrupter 34 to provide better dissipation of any arc created at the secondary relay, MEMS Interrupter 34. The input inductor 48 is thus in series with the line input. The input inductor 48 is sized to carry the full rated load of the breaker and to limit the current rise rate. The value of the input inductor 48 is a compromise between current carrying capability and size. Values will in general fall in the low single digit μH range for that reason.

The arc chute 36 is, in one implementation, a stationary set of electrodes that guide the arc away from MEMS Interrupter 34 after it forms when the contacts of the secondary MEMS relay 14 open. The arc travels along the curved arc chute carriers, expanding as they diverge from each other. When it reaches the intermediate arc rails, it is broken into several smaller arcs. Finally, the moving expanding air and its associated energy is expelled from the breaker through a vent (not shown).

Figure 5:
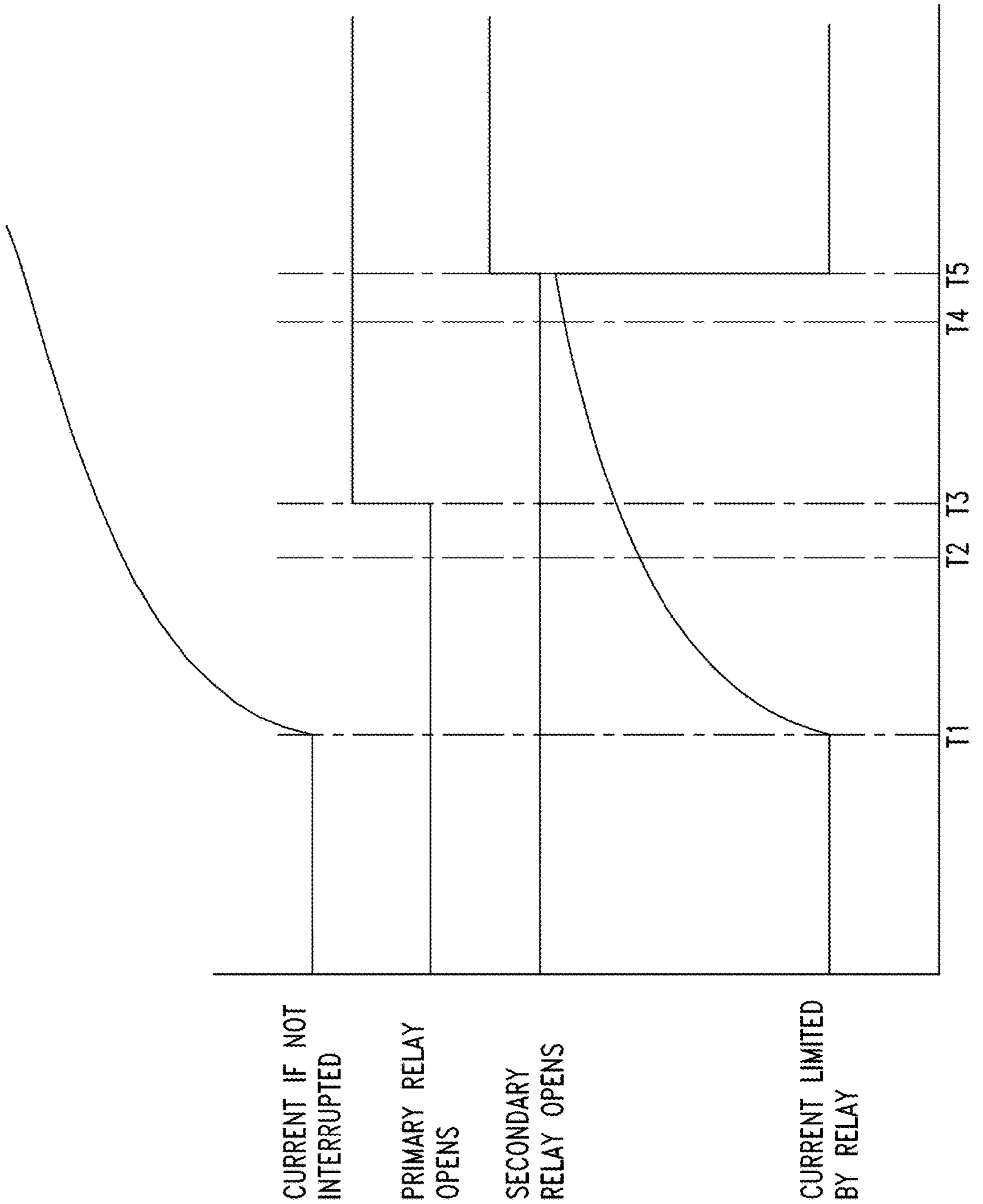
FIG. 5 illustrates the timing for a hybrid circuit breaker including two MEMS relays or in another instantiation it consists of one MEMS primary relay and one conventional secondary relay.

FIG. 5—Timing for MEMS Secondary

FIG. 5 illustrates the timing for a hybrid circuit breaker including two MEMS relays or in another instance it consists of one MEMS primary relay and one conventional secondary relay. In this design, a primary relay is optimized to have an extremely low resistance in the closed position. A secondary relay may have higher resistance. Its chief attribute is improved robustness against arcing during the time the relay opens. FIG. 5 shows four individual signals. They are shown on a common horizontal time axis but are on individual vertical axes representing either current or the open/close state for a relay. These charts illustrate the sequence of events triggered by the circuit breaker control logic when it determines that the circuit is experiencing a short circuit. From top to bottom of the chart, the traces represent:

Current if not interrupted. This trace illustrates the rapid rise time of the current if the breaker were not opened. The horizontal line up until time T1 represents proper steady state current. T1 is the point at which the short circuit forms. When the short starts, the current rises rapidly, limited only by the sourcing capacity of the power source and the impedance of the short. This curve would continue to rise off the top of the chart.

Primary Relay Opens. The control logic is monitoring the current through the relay. It must distinguish true short circuits which lead to HIC events from small overloads which might trigger a 'nuisance trip.' At point T2, the breaker logic has determined that a short circuit is in effect and the logic sends a signal to open the primary relay. The primary relay takes a finite time (from T2 to T3) to open, and by time T3 it is open far enough to withstand the voltage generated across the breaker. Note that the opening time (T3−T2) for a MEMS relay is approximately 50 microseconds, much faster than the opening time for a conventional relay, which may be 10s of milliseconds, hundreds of times slower. During the opening time the current continues to increase. The energy is the integral of the power that is proportional to the square of the current, which is proportional to the time for a linear rise in current. Therefore, the energy is proportional to the cube of the time to open. This is the driver for getting to the fastest possible opening. The secondary relay remains closed, and the current is diverted from the main relay through the secondary relay.

Secondary Relay Opens. The control logic pauses after opening the main relay. It leaves the secondary relay closed until enough time has elapsed to allow the main relay to open far enough to provide adequate standoff distance to prevent arcing at the rated voltage. This minimum delay is the time between T2 and T3. At time T4 the control logic sends a signal to open the secondary relay. The secondary relay also takes time to open, and it is subject to arcing until it is open enough to extinguish any arc. This opening time (T4−T5) is also dependent on the type of relay used for the secondary relay. A MEMS device will open faster, significantly lowering the maximum current generated before the relay opens, and thereby lowering the total energy which must be dissipated in the form of an arc. For a current that rises linearly with time, the energy put into the relay resistance is:

$$E = R * k^2 * t^3 / 3$$

E energy

R contact resistance k current rise time in A/s t time until opening

So rise time is squared, time is cubed. Cutting the opening time in half will result in $\frac{1}{8}^{th}$ the energy.

Current Limited by Relay. This trace shows the current flowing in the controlled situation. As in the first trace, the current starts to rise at time T1. The current continues to rise after the primary relay opens at T3. Between T3 and T5 the current is flowing through the secondary relay. At T5, when the secondary relay opens, the circuit is completely open, and the current drops to 0. Depending on the design of the secondary relay, there will be some current flowing in the form of an arc for a period after the secondary relay starts opening.

Figure 6:
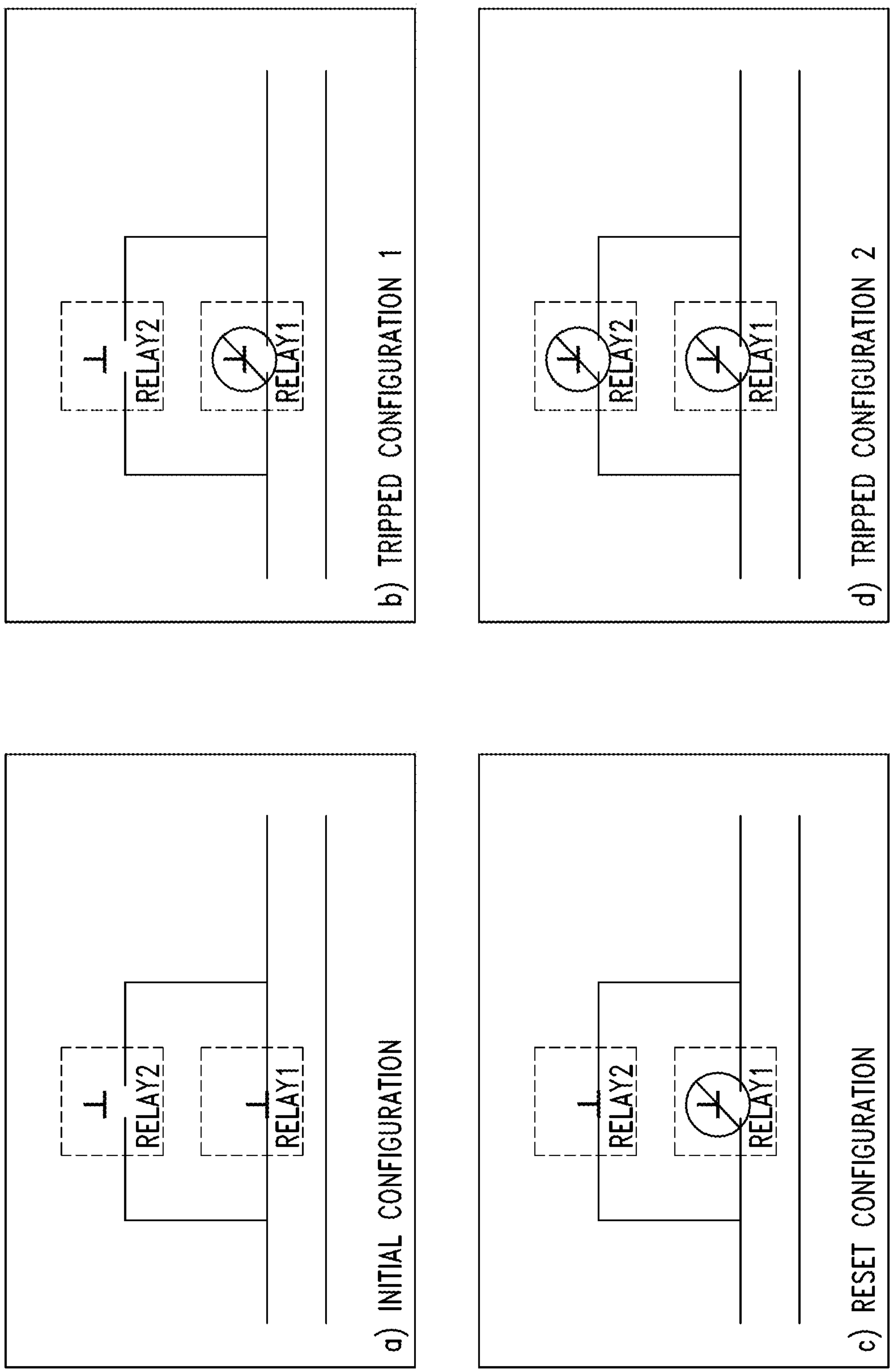
FIG. 6 illustrates the sequence of states followed by a hybrid circuit breaker with multiple sacrificial MEMS relays.

FIG. 6: MEMS Sacrificial Relay Operation

FIG. 6 illustrates the sequence of states followed by a hybrid circuit breaker with multiple sacrificial MEMS relays. In this example, each relay is a version with a low contact resistance. FIG. 6 is divided into four separate states, a-d.

a) Initial configuration. In this state a newly installed breaker is conducting current through Relay 1, which is the only relay in a closed position. State a) will persist until the breaker trips during a High Current Event.

b) Tripped configuration 1. In this state, all relays are open. Relay 1 has been designated as potentially failed after it opened during the High Current Event. Each potentially failed relay is marked in the drawing using a circle with a line through it.

c) Reset configuration. After the short circuit has been corrected, the circuit breaker is reset. The control logic assumes that Relay 1 has been damaged in responding to the event in state a). The control logic therefore leaves Relay 1 in its open state and closes Relay 2 to conduct current until a further event occurs.

d) Tripped configuration 2. If a second High Current Event happens while Relay 2 is closed, the control logic will signal Relay 2 to open. The control logic will now consider Relay 2 to be damaged. If the breaker has only two relays, it will no longer be resettable. If additional relays are installed in the breaker, then each additional relay in turn will go through the cycle of being the current carrying relay and the interrupting relay as illustrated in states a) through d).

Figure 7:
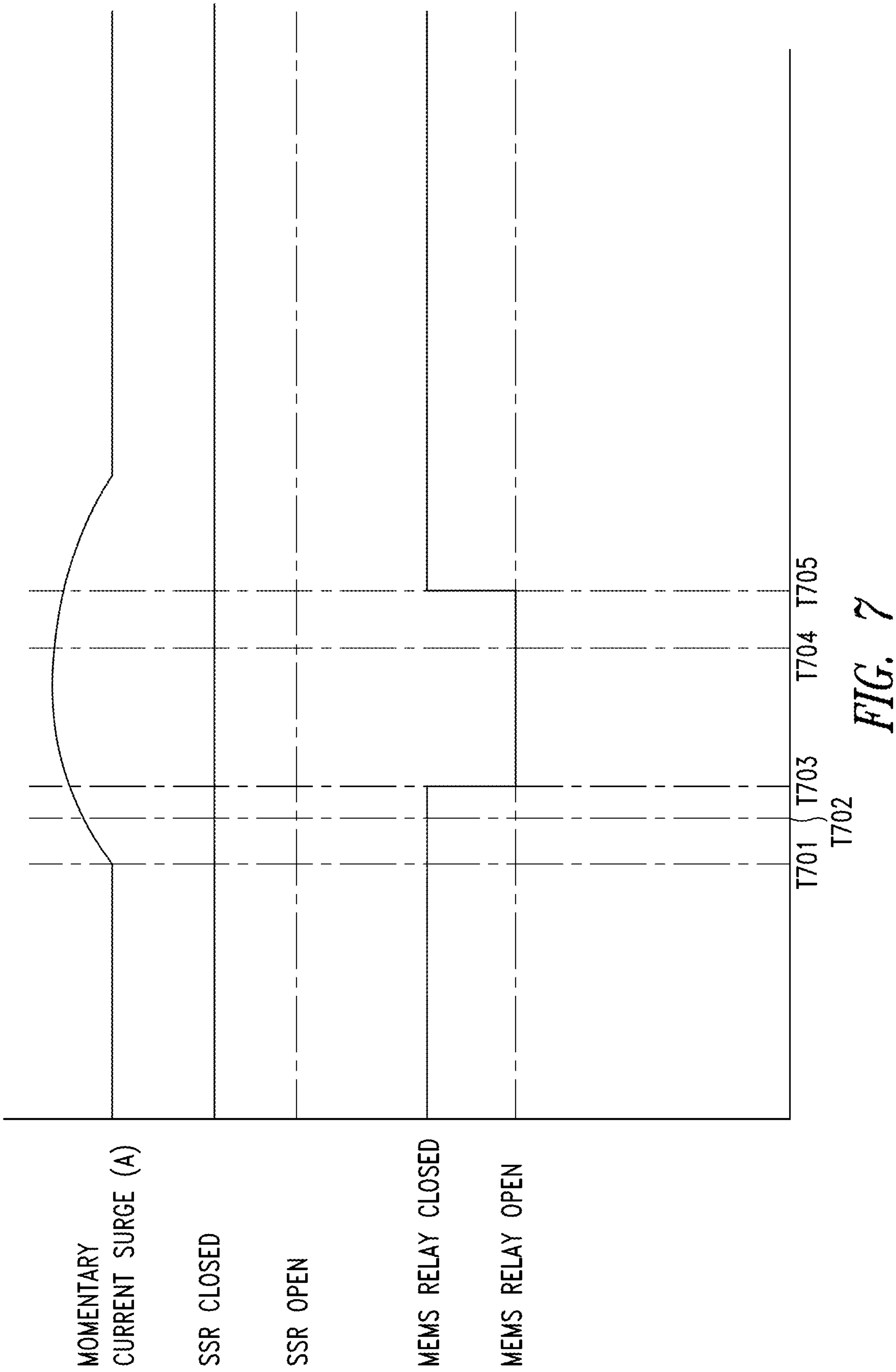
FIG. 7 illustrates the timing for a rapid surge detection sequence in the case of a momentary current surge that does not require opening the hybrid circuit breaker.
Figure 8:
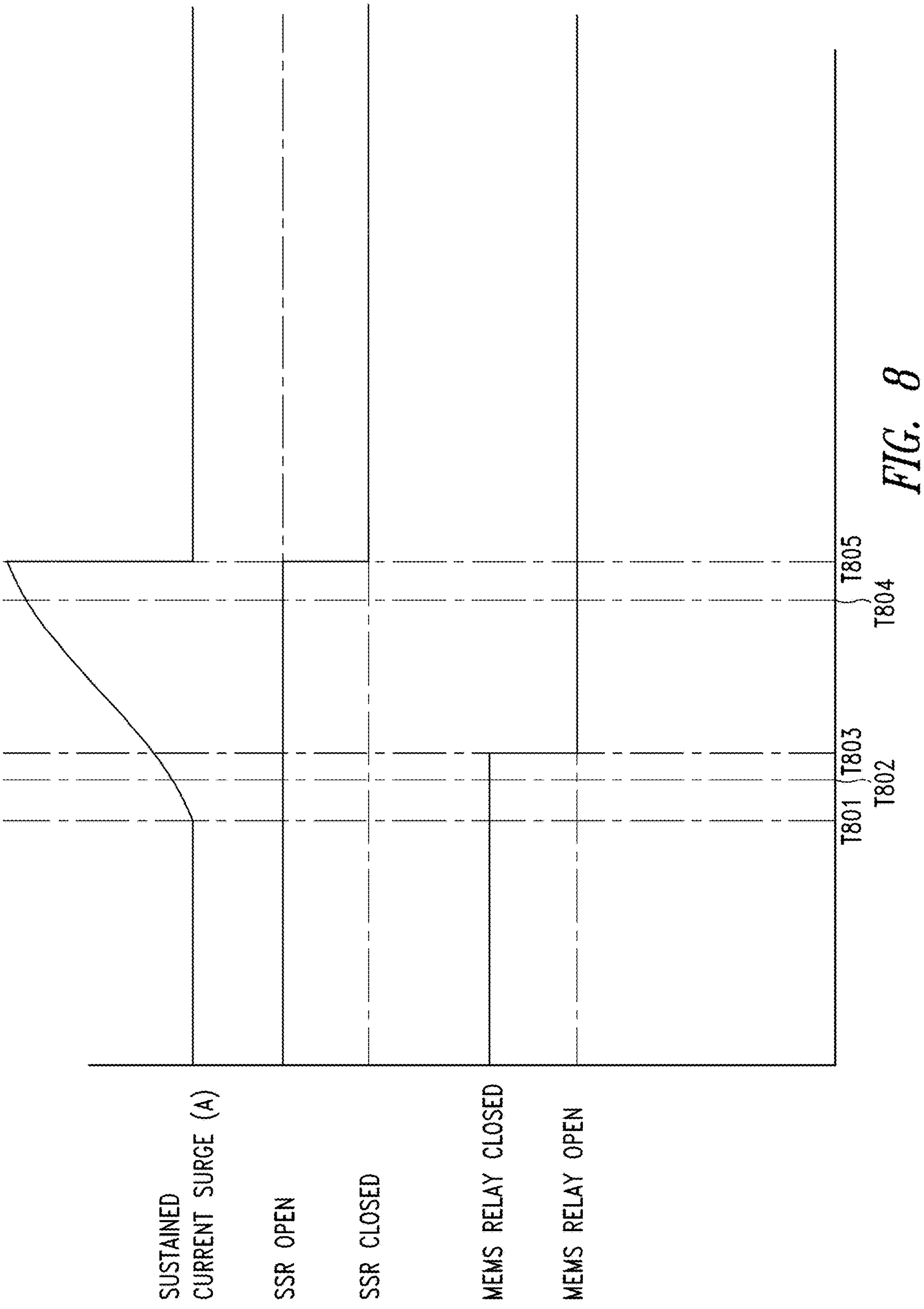
FIG. 8 illustrates the timing for a rapid surge detection sequence in the case of a sustained current surge that requires opening the hybrid circuit breaker.

FIGS. 7 and 8: Rapid Detection of a Surge

FIGS. 7 and 8 illustrate a means of protecting the MEMS relay from arcing in a normal excess current trip event. Both FIGS. 7 and 8 apply to a breaker configuration as shown in FIG. 1, with a solid-state relay in parallel with a MEMS relay. It is important that the circuit breaker open, or 'trip' when the current exceeds the rated current for a defined period of time. It is also important that the circuit breaker not trip because of a short-duration surge, which may be caused by events such as starting up an appliance or motor. These trips due to short-duration events are known as 'nuisance trips.' FIG. 7 illustrates a brief current surge which might trigger a nuisance trip. FIG. 8 illustrates a longer-duration current surge. In FIG. 7 the current starts ramping up at time T701. The control logic is monitoring the current, and at time T702 it determines that a spike is occurring. It cannot yet know if the spike is of a short or long duration. It nonetheless preemptively sends a signal to the MEMS relay, causing the MEMS relay to open at time T703. Current now flows though the solid-state relay, and it starts to heat up due to its internal resistance. At time T704, the current has started to go back down, and the control logic determines that this is a momentary surge. The control logic therefore sends a signal to the MEMS relay to close, and it does so at time T705. The current goes back to flowing through the MEMS relay, as it has lower on-resistance than the solid-state relay. As long as the time between T703 and T705 is short, the solid-state relay will not overheat. The time limit between T703 and T705 is determined by the amount of current flowing, the internal resistance of the solid-state relay, and the solid-state relay's ability to reject the heat produced as the product of the current and the internal resistance of the solid-state relay.

In FIG. 8, the current starts rising at T801. The control logic detects this at time T802, and preemptively opens the MEMS relay at T803. In this case, however, the current continues to rise. At time T804, the control logic determines that this is not a momentary surge, and that the breaker needs to open. The MEMS relay is already open, so the control logic sends a signal to open the solid-state relay. The solid-state relay opens at time T805, and the current falls to zero. The solid-state relay has no mechanical separation of contacts and therefore will not arc as it opens. It should be noted that a breaker configuration as shown in FIG. 1 will require an additional mechanical relay in series with the solid-state relay to provide galvanic isolation between the line and load.

It can be seen from the descriptions of FIGS. 7 and 8 that this approach will eliminate the chance of arcing during a standard circuit breaker trip event. The rapid detection of potential opening situations will minimize the time during which a solid-state relay must carry the load, as the MEMS relay will already be open when the control logic determines that it is appropriate to open the breaker. This minimal time will result in less energy being dissipated in the solid-state relay, which permits designers to use smaller, less expensive components. These components may tolerate higher internal resistance values as they will not need to carry the load for as long an interval.

It will be appreciated from the foregoing that the small size and low resistance of the MEMS relay allows a standard sized circuit breaker to tolerate much more current than a similarly sized semiconductor breaker. It further allows the control of the relay by means of digital signals, providing additional features compared with a traditional circuit breaker. The size is important because it allows the breaker to be installed in a standard electrical load center, enabling its use as an easily installed retrofit.

It is to be understood that various changes can be made to the disclosure to enhance its utility. The various embodiments described above can be combined to provide further embodiments. Aspects of the embodiments can be modified, if necessary to employ concepts of the various patents, applications, and publications to provide yet further embodiments.

The invention claimed is:

1. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load, wherein the second relay circuit is a sacrificial device; and a control logic circuit having a first pair of control terminals coupled to the first and second control input terminals of the first relay circuit, a second pair of control terminals coupled to the second relay circuit, and at least one current sense input coupled to the voltage source.

2. The circuit of claim 1, wherein the control logic circuit includes a third pair of control terminals, and wherein the circuit comprises:

a third relay circuit having first and second control input terminals coupled to the third pair of control terminals and one or more line in input terminals coupled to the voltage source and one or more line out output terminals coupled to the load such that the third relay circuit is coupled in parallel with the first and second relay circuits.

3. The circuit of claim 2, wherein the second and third relay circuits each have a relay design that is different from the MEMS device of the first relay circuit.

4. The circuit of claim 2, wherein the third relay circuit is a sacrificial device.

5. The circuit of claim 2, wherein the second and third relay circuits each include a MEMS relay that is identical to the MEMS device of the first relay circuit.

6. The circuit of claim 5, wherein the control logic circuit is configured to:

determine whether the second relay circuit has been damaged by an earlier short circuit;

in response to determining that the second relay circuit has not been damaged, control the first and second relay circuits to operate in a closed state during normal operation;

detect an increase in current;

in response to detecting the increase in current, control the first relay circuit to transition to an open state;

delay for a fixed time duration; and after delaying for the fixed time duration, control the second relay circuit to transition to the open state; and in response to determining that the second relay circuit has been damaged, control the first and third relay circuits to operate in the closed state during normal operation;

detect an increase in current;

in response to detecting the increase in current, control the first relay circuit to transition to the open state;

delay a fixed amount of time duration; and after delaying for the fixed time duration, control the third relay circuit to transition to the open state.

7. The circuit of claim 1, wherein the second relay circuit includes a solid-state relay circuit.

8. The circuit of claim 1, wherein the control logic circuit is configured to:

control the first and second relay circuits to operate in a closed state during normal operation;

detect an increase in current;

in response to detecting the increase in current, preemptively control the first relay circuit to transition to an open state;

determine that the increase in current is a true short; and in response to determining that the increase in current is a true short, control the second relay circuit to transition to the open state.

9. The circuit of claim 8, wherein the control logic circuit is configured to determine that the increase in current is a true short by determining that the true short is not an inrush current event.

10. The circuit of claim 1, wherein the control logic circuit is configured to:

control the first and second relay circuits to operate in a closed state during normal operation;

detect an increase in current;

in response to detecting the increase in current, preemptively control the first relay circuit to transition to an open state;

determine that the increase in current is an inrush current event; and in response to determining that the increase in current is an inrush current event, control the first relay circuit to transition to the closed state.

11. The circuit of claim 1, wherein the control logic circuit is configured to:

control the first and second relay circuits to operate in a closed state during normal operation;

detect an increase in current;

in response to detecting the increase in current, control the first relay circuit to transition to an open state;

delay for a fixed time duration; and after delaying for the fixed time duration, control the second relay circuit to transition to the open state.

12. A method, comprising:

operating first and second relay circuits in a closed state, the first and second relay circuits being coupled to each other in parallel and the first and second relay circuits being together coupled in series to a voltage source and a load, the first relay circuit including a Microelectromechanical System (MEMS) device;

sensing a current from the voltage source;

detecting an increase in the current;

in response to detecting the increase in current, preemptively controlling the first relay circuit to transition to an open state;

determining whether the increase in current is a true short or an inrush current event; and selectively controlling the first relay circuit to transition to the closed state or the second relay circuit to transition to the open state depending on whether the increase in current is an inrush current event or a true short.

13. The method of claim 12, wherein selectively controlling the first relay circuit to transition to the closed state or the second relay circuit to transition to the open state includes:

in response to determining that the increase in current is an inrush current event, controlling the first relay circuit to transition to the closed state.

14. The method of claim 12, wherein selectively controlling the first relay circuit to transition to the closed state or the second relay circuit to transition to the open state includes:

in response to determining that the increase in current is a true short, controlling the second relay circuit to transition to the open state.

15. The method of claim 12, wherein the second relay circuit includes a MEMS relay that is identical to the MEMS device of the first relay circuit.

16. A system, comprising:

a voltage source;

a load; and a circuit including:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, and at least one current sense input coupled to the voltage source, wherein the control logic circuit includes a third pair of control terminals, wherein the circuit includes a third relay circuit having first and second control input terminals coupled to the third pair of control terminals, wherein the third relay circuit is coupled in parallel with the first and second relay circuits, and together the first, second and third relay circuits are coupled in series between the voltage source and the load, and wherein the second and third relay circuits are sacrificial devices.

17. The system of claim 16, wherein the second and third relay circuits each include a MEMS relay that is identical to the MEMS device of the first relay circuit.

18. The system of claim 16, wherein the second and third relay circuits each have a relay design that is different from the MEMS device of the first relay circuit.

19. The system of claim 16, wherein the second and third relay circuits each include a solid-state relay circuit.

20. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, a third pair of control terminals, and at least one current sense input coupled to the voltage source;

a third relay circuit having first and second control input terminals coupled to the third pair of control terminals and one or more line in input terminals coupled to the voltage source and one or more line out output terminals coupled to the load such that the third relay circuit is coupled in parallel with the first and second relay circuits, wherein the third relay circuit is a sacrificial device.

21. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load;

a control logic circuit having a first pair of control terminals coupled to the first and second control input terminals of the first relay circuit, a second pair of control terminals coupled to the second relay circuit, and at least one current sense input coupled to the voltage source; and a third relay circuit having first and second control input terminals coupled to the third pair of control terminals and one or more line in input terminals coupled to the voltage source and one or more line out output terminals coupled to the load such that the third relay circuit is coupled in parallel with the first and second relay circuits, wherein the second and third relay circuits each include a MEMS relay that is identical to the MEMS device of the first relay circuit.

22. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, and at least one current sense input coupled to the voltage source, wherein the control logic circuit is configured to:

control the first and second relay circuits to operate in a closed state during normal operation;

detect an increase in current;

in response to detecting the increase in current, preemptively control the first relay circuit to transition to an open state;

determine that the increase in current is a true short; and in response to determining that the increase in current is a true short, control the second relay circuit to transition to the open state.

23. The circuit of claim 22, wherein the control logic circuit is configured to determine that the increase in current is a true short by determining that the true short is not an inrush current event.

24. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, and at least one current sense input coupled to the voltage source, wherein the control logic circuit is configured to:

control the first and second relay circuits to operate in a closed state during normal operation;

detect an increase in current;

in response to detecting the increase in current, preemptively control the first relay circuit to transition to an open state;

determine that the increase in current is an inrush current event; and in response to determining that the increase in current is an inrush current event, control the first relay circuit to transition to the closed state.

25. A circuit for use in circuit breakers with a voltage source and a load, comprising:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, and at least one current sense input coupled to the voltage source, wherein the control logic circuit is configured to:

control the first and second relay circuits to operate in a closed state during normal operation;

detect an increase in current;

in response to detecting the increase in current, control the first relay circuit to transition to an open state;

delay for a fixed time duration; and after delaying for the fixed time duration, control the second relay circuit to transition to the open state.

26. A system, comprising:

a voltage source;

a load; and a circuit including:

a first relay circuit having first and second control input terminals, the first relay circuit being coupled in series with the voltage source and the load using one or more line in input terminals coupled to the voltage source and one or more line out output terminals coupled to the load, the first relay circuit including a Microelectromechanical System (MEMS) device;

a second relay circuit having first and second control input terminals, the second relay circuit being coupled in parallel with the first relay circuit using the one or more line in input terminals coupled to the voltage source and the one or more line out output terminals coupled to the load; and a control logic circuit having a first pair of control terminals coupled to the first and second control input terminals of the first relay circuit, a second pair of control terminals coupled to the second relay circuit, and at least one current sense input coupled to the voltage source, wherein the control logic circuit includes a third pair of control terminals, wherein the circuit includes a third relay circuit having first and second control input terminals coupled to the third pair of control terminals, wherein the third relay circuit is coupled in parallel with the first and second relay circuits, and together the first, second and third relay circuits are coupled in series between the voltage source and the load, and wherein the second and third relay circuits each include a MEMS relay that is identical to the MEMS device of the first relay circuit.

* * * * *